(No Model.)
S. P. BLACKBURN.
VALVE FOR STEAM ENGINES.
No. 347,915. Patented Aug. 24, 1886.
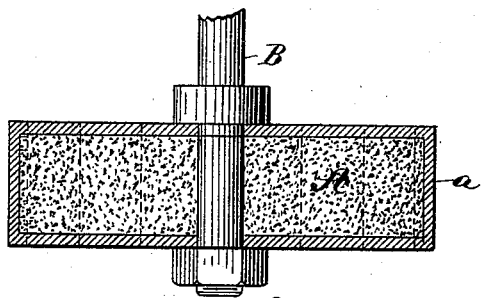
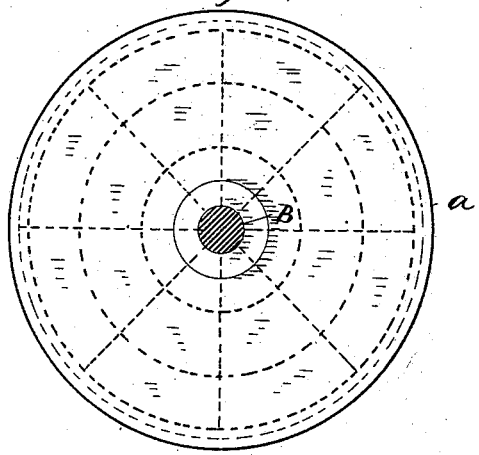
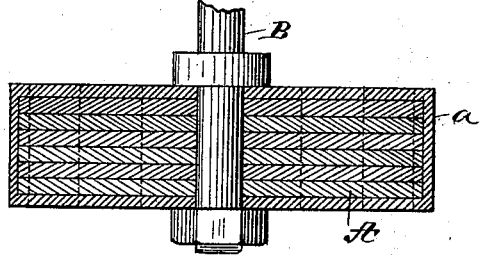
Witnesses.
Gabriel J. W. Gylster
K. M. Supple.
Inventor
Samuel P. Blackburn
By
Richards
Attorneys

UNITED STATES PATENT OFFICE.

SAMUEL P. BLACKBURN, OF BOSTON, MASSACHUSETTS.

VALVE FOR STEAM-ENGINES.

SPECIFICATION forming part of Letters Patent No. 347,915, dated August 24, 1886.

Application filed November 9, 1885. Serial No. 182,242. (No model.)

*To all whom it may concern:*

Be it known that I, SAMUEL PERCY BLACKBURN, of the city of Boston, in the county of Suffolk and State of Massachusetts, have invented a new and useful Improvement in Valves for Steam-Engines, Pumps, &c.; and I hereby declare the following to be a full and clear description thereof.

This invention relates to a valve formed of such soft or yielding material as will give all the benefits derived from the use of an india-rubber valve and possess a durability which is impossible with an india-rubber valve in places where it is subjected to the action of steam or grease.

The invention consists in making my improved valve of any animal or vegetable fiber, in the manner hereinafter more fully explained and described.

The invention will be readily understood by reference to the accompanying drawings, in which Figure 1 is a central sectional elevation of one of my improved valves, and Fig. 2 is a general plan of it. Fig. 3 is a sectional view of one of my improved valves where the fibrous material is formed in layers.

The body of the valve A is made of any animal or vegetable fiber—such, for instance, as hair, wool, cotton, flax, hemp, jute, ramie, &c.—which may be placed in position in the said valve in any desired or practical form—as, for instance, it may be formed into sheets or layers by weaving, plaiting, laying, felting, &c., or packed in mass in a suitable inclosure or case, *a*, which is made of any suitable woven fabric—as, for instance, any strong canvas, cotton duck, or any similar material. In making this case the material is cut into the form desired and then sewed together with its inside out, leaving a suitable slit in one of its sides, through which it may be filled. After having sewed up this case in the required form it is turned the proper side out, and it is then filled with the above-described filling of an animal or vegetable fiber, either in sheets or layers or in mass, and then the filling-slit is sewed up. The entire valve should then be stitched or sewed together by through-and-through stitches, preferably made in concentric or radial lines, or in both concentric and radial lines, about the common center of the valve. The sewing may be done with either thread or wire. I prefer thread, however. Instead of sewing, the fastening of the valve may be accomplished by riveting or stapling, or in any other suitable manner, as preferred. After this a suitable aperture through the valve may be made for the valve-rod B, using for this purpose a concave cutter or other suitable implement. After the valve is thus formed into the proper shape it is further prepared for use by soaking or boiling it in a preserving and hardening substance—as, for instance, paraffine, boiled linseed-oil, or oil and turpentine—and after that it is beneficial to press it by a suitable press or between rollers, this pressure causing the said filling and hardening material to penetrate to the innermost part of the substance of the valve.

I am aware that valves having a soft or compressible interior formed of a hair filling held in place between a dished metallic plate and an attached leather backing or cushioned side have been in use on gas-meters, air-engines, &c.; but as such valves would be destroyed immediately by the action of steam on the leather they are not suited to my purpose.

Having thus described my invention, what I claim as new, and desire to secure by Letters Patent, is—

1. A valve for use in steam, water, oil, or other engines, pumps, or appliances, formed of any suitable animal or vegetable fiber fastened together by sewing or equivalent fastening means, substantially as shown and described.

2. A valve formed of any suitable vegetable or animal fiber closely packed or laid in an inclosing case or cover, the whole being securely fastened together by sewing or equivalent fastening means, substantially as set forth.

3. A valve made of any animal or vegetable fiber held between two confining-disks of a textile fabric by means of sewing or similar fastenings, substantially as shown and described.

4. A valve formed of any suitable animal or vegetable fiber having sewing or equivalent fastenings, said valve being saturated with any suitable filling material, such as paraffine, oil, &c., thus preserving and hardening it, substantially as described and set forth.

5. A valve formed of any suitable animal or vegetable fiber sewed or otherwise fastened in place, saturated with a suitable filling material, and subjected to pressure so as to leave it in a condensed form, substantially as described.

In witness whereof I hereunto set my hand in presence of two witnesses.

SAMUEL P. BLACKBURN.

Witnesses:
WM. A. KNOWLTON,
ALFRED R. BAXTER.